(12) United States Patent
Sohma et al.

(10) Patent No.: US 7,544,433 B2
(45) Date of Patent: Jun. 9, 2009

(54) ELECTRODE STRUCTURE FOR POLYMER ELECTROLYTE FUEL CELLS, AND POLYMER ELECTROLYTE FUEL CELL USING THE SAME

(75) Inventors: Hiroshi Sohma, Saitama (JP); Masaru Iguchi, Saitama (JP); Nagayuki Kanaoka, Saitama (JP); Hayato Kaji, Saitama (JP); Hiroshi Morikawa, Saitama (JP); Naoki Mitsuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 593 days.

(21) Appl. No.: 10/714,394

(22) Filed: Nov. 17, 2003

(65) Prior Publication Data

US 2004/0197632 A1    Oct. 7, 2004

(30) Foreign Application Priority Data

Nov. 18, 2002  (JP)  ............................. 2002-333143
Oct. 30, 2003  (JP)  ............................. 2003-371047

(51) Int. Cl.
*H01M 8/10* (2006.01)
(52) U.S. Cl. .......................... 429/33; 429/30; 429/40; 429/41; 429/44
(58) Field of Classification Search ................ 429/33, 429/30, 40, 41, 44
See application file for complete search history.

(56) References Cited

U.S. PATENT DOCUMENTS 6,096,856 A * 8/2000 Helmer-Metzmann et al. .......... 528/374

(Continued)

FOREIGN PATENT DOCUMENTS

DE    102 01 886 A1    8/2002

(Continued)

OTHER PUBLICATIONS

Nolte et al. "Partially sulfonated poly(arylene ether sulfone)-Aversatile proton conducting membrane material for modern energy conversion technologies", Journal of Membrane Science, 83 (1993), pp. 211-220.*

Primary Examiner—Laura S Weiner
(74) Attorney, Agent, or Firm—Arent Fox LLP (57) ABSTRACT

The present invention provides an electrode structure for polymer electrolyte fuel cells, inexpensive, and exhibiting excellent power production capacity and durability even under high temperature/low humidity conditions, and also provides a polymer electrolyte fuel cell which incorporates the same electrode structure. The present invention also provides an electrical device and transportation device, each incorporating the same polymer electrolyte fuel cell. The electrode structure comprises a pair of electrode catalyst layers 1,1, each containing a catalyst supported by carbon particles, and polymer electrolyte membrane 2 placed between these electrode catalyst layers 1,1. The polymer electrolyte membrane 2 is of a sulfonated polyarylene composed of 0.5 to 100% by mol of the first repeating unit represented by the general formula (1) and 0 to 99.5% by mol of the second repeating unit represented by the general formula (2):

(1)

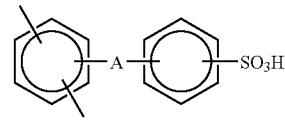

(wherein, A is a divalent organic group; and a benzene ring includes its derivative), (2)

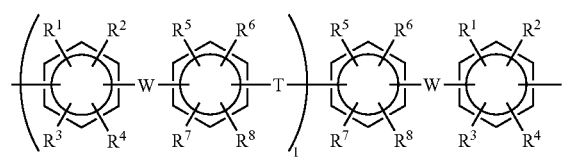

(wherein, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different).

10 Claims, 3 Drawing Sheets

U.S. PATENT DOCUMENTS

| | | | |
|---|---|---|---|
| 6,926,984 B2 * | 8/2005 | Asano et al. | 429/33 |
| 7,163,988 B2 * | 1/2007 | Rozhanskii et al. | 525/535 |
| 2002/0164513 A1 | 11/2002 | Asano et al. | 429/32 |

FOREIGN PATENT DOCUMENTS

| | | |
|---|---|---|
| EP | 1 245 554 A1 | 10/2002 |
| EP | 1 329 444 A1 | 7/2003 |
| JP | 10-241703 | 9/1998 |
| JP | 2000-223136 | 8/2000 |
| JP | 2002-298869 | 10/2002 |
| JP | 2004-137444 | 5/2004 |

* cited by examiner

ELECTRODE STRUCTURE FOR POLYMER ELECTROLYTE FUEL CELLS, AND POLYMER ELECTROLYTE FUEL CELL USING THE SAME

BACKGROUND OF THE INVENTION

1. Field of the Invention

The present invention relates to an electrode structure for polymer electrolyte fuel cells, and polymer electrolyte fuel cell using the same.

2. Description of the Related Art

The environmental problems, e.g., global warming, resulting from consumption of fossil fuels are becoming more serious, while oil resources are being depleted. Therefore, fuel cells have been attracting attention as clean power sources for motors, which release no carbon dioxide. They have been extensively developed, and commercialized in some areas. When a fuel cell is mounted in an automobile or the like, a polymer electrolyte fuel cell including a polymer electrolyte membrane is suitably used, because of its capacity to produce a high voltage and large electric current.

As an electrode structures for polymer electrolyte fuel cell, one comprising a pair of electrode catalyst layers composed of a catalyst of platinum or the like supported by a catalyst carrier of carbon black or the like and monolithically formed by an ion-conductive polymer binder, and an ion-conductive polymer electrolyte membrane placed between these electrode catalyst layers in which each electrode catalyst layer is coated with a diffusion layer (see, e.g., by Japanese Patent Laid-Open No. 2000-223136). The electrode structure constitutes a polymer electrolyte fuel cell with a separator, which also works as a gas passage, laminated on each of the electrode catalyst layers.

In the polymer electrolyte fuel cell, a reducing gas, e.g., hydrogen or methanol, is introduced into one electrode catalyst layer working as the fuel electrode via the diffusion layer, and an oxidizing gas, e.g., air or oxygen, is introduced into the other electrode catalyst layer working as the oxygen electrode also via the diffusion layer. This structure produces proton from the reducing gas on the fuel electrode by the actions of the catalyst in the electrode catalyst layer. The proton moves towards the electrode catalyst layer on the oxygen electrode side via the polymer electrolyte membrane, to react with the oxidizing gas introduced on the oxygen electrode to produce water in the electrode catalyst layer on the oxygen electrode side by the actions of the catalyst contained in the catalyst layer. Therefore, a current can be produced by connecting the fuel electrode and oxygen electrode to each other by a cable.

For the polymer electrolyte membrane in the electrode structure, perfluoroalkylenesulfonic acid polymer compounds (e.g., Du Pont's Nafion (trade name)) have been widely used. The perfluoroalkylenesulfonic acid polymer compound exhibits good proton conductivity and chemical resistance as a fluorine-based resin, because it is sulfonated.

However, perfluoroalkylenesulfonic acid polymer compound involves some disadvantages. It is very expensive, and low in creep resistance at high temperature and hence difficult to stably retain its shape. Another disadvantage results from its high gas permeability, which may deteriorate its durability, in particular under high temperature/low humidity conditions, because oxygen may cross-leaks from the cathode side to react in the vicinity of the catalyst on the anode side to produce hydrogen peroxide as a by-product, which will accelerate deterioration of the membrane.

SUMMARY OF THE INVENTION

It is an object of the present invention to provide an electrode structure for polymer electrolyte fuel cells, which is inexpensive, and exhibits excellent power production capacity and durability even under high temperature/low humidity conditions by solving the above problems.

It is another object of the present invention to provide a polymer electrolyte fuel cell using the same electrode structure.

An electrode structure for polymer electrolyte fuel cells may be composed of a hydrocarbon-based polymer or the like, in place of the perfluoroalkylenesulfonic acid polymer compound, as a less expensive ion-conductive material. The hydrocarbon-based polymer has high gas barrier property and creep-resistant, that is to say it has low gas permeability and high shape stability.

The inventors of the present invention have found, after having extensively screened a variety of hydrocarbon-based polymers, that an electrode structure for polymer electrolyte fuel cells can exhibit excellent power production capacity and durability even under high temperature/low humidity conditions, when it is composed of a specific sulfonated polyarylene as the ion-conductive material, achieving the present invention.

The present invention provides an electrode structure for polymer electrolyte fuel cells, comprising a pair of electrode catalyst layers, each containing a catalyst supported by carbon particles, and a polymer electrolyte membrane placed between these electrode catalyst layers, wherein the polymer electrolyte membrane is formed from a sulfonated polyarylene consisting of 0.5 to 100% by mol of a first repeating unit represented by the general formula (1) and 0 to 99.5% by mol of a second repeating unit represented by the general formula (2):

(1)

(wherein, A is a divalent organic group; and a benzene ring includes its derivative), (2)

(wherein, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different).

Examples of the divalent organic group include electron attracting groups, e.g., —CO—, —CONH—, —(CF$_2$)$_p$— ("p" is an integer of 1 to 10), —C(CF$_3$)$_2$—, —COO—, —SO— and —SO$_2$—; electron donating groups. e.g. —O—, —S—, —CH=CH—, and —C≡C—; and groups represented by the following formula:

Examples of the divalent electron attracting group include —CO—, —CONH—, —(CF$_2$)$_p$— ("p" is an integer of 1 to 10), —C(CF$_3$)$_2$—, —COO—, —SO— and —SO$_2$—.

The sulfonated polyarylene can be prepared by copolymerization of 0.5 to 100% by mol of the first component represented by the general formula (1') with 0 to 99.5% by mol of the second component represented by the general formula (2'), and then hydrolyzing the sulfonic acid ester group (—SO$_3$R).

(wherein, A is a divalent organic group; and a benzene ring includes its derivative), (wherein, —W— is a divalent electron attracting group; -T- is a divalent organic group; and R$^1$ to R$^8$ are a hydrogen atom or fluorine atom, an alkyl group, fluorine-substituted alkyl group, allyl group, aryl group or cyano group, and may be the same or different).

The divalent organic group and divalent electron attracting group are the same as those in the general formula (1) or (2).

In the general formula (1'), X is an atom or a group selected from a halogen atom (chlorine, bromine or iodine) except fluorine, or a group consisting of —OSO$_3$CH$_3$ and —OSO$_3$CF$_3$; and R is a hydrocarbon group of 4 to 20 carbon atoms. In the general formula (2'), R' and R" which may be the same or different are a halogen atom except fluorine or a group of —OSO$_2$Z (Z is an alkyl, fluorine-substituted alkyl or aryl group).

In the electrode structure for polymer electrolyte fuel cell of the present invention, the sulfonated polyarylene for the polymer electrolyte membrane is a sulfonated hydrocarbon-based polymer, and hence is inexpensive and gives a good power production capacity. The sulfonated polyarylene as a sulfonated hydrocarbon-based polymer exhibits higher gas barrier property than perfluoroalkylenesulfonic acid polymer compound, and thus prevents production of hydrogen peroxide in the vicinity of the catalyst on the electrode more efficiently and exhibits higher durability under high temperature/low humidity conditions.

On the other hand, a sulfonated polyarylene produced by sulfonating polymerized polyarylene to introduce sulfonic group in the benzene ring tends to suffer elimination of the sulfonic group from the benzene ring. Therefore, such a sulfonated polyarylene needs to have higher sulfonating equivalents to secure a required ion-exchanging capacity. However, the sulfonated polyarylene tends to have the sulfonic group and oxy group (—O—) working as the crosslinking points under high temperature/low humidity conditions to produce insoluble components by the inter-molecular crosslinking reactions. This tendency is more noted as it has higher sulfonating equivalents. As a result, it loses toughness and difficult to secure sufficient durability.

In contrast, the sulfonated polyarylene used in the present invention is produced by copolymerization of the first component represented by the general formula (1') with the second component represented by the general formula (2'), and then hydrolyzing the —SO$_3$R group into sulfonic group (—SO$_3$H) The first component represented by the general formula (1') already has the —SO$_3$R group bound to the benzene ring, and the sulfonic group as the hydrolyzing product of the —SO$_3$R group will not be easily eliminated from the benzene ring. Therefore, the sulfonated polyarylene for the present invention can have lower sulfonating equivalents to secure a required ion-exchanging capacity. Moreover, the sulfonated polyarylene for the present invention has no oxy group, potentially providing a crosslinking point, in the molecular structure, which reduces production of the insoluble components by the inter-molecular crosslinking between the sulfonated polyarylene molecules under high temperature/low humidity conditions, and is advantageous for securing good durability.

As a result, the electrode structure of the present invention for polymer electrolyte fuel cells can exhibit excellent power production capacity and durability even under high temperature/low humidity conditions.

The "sulfonated polyarylene" described in this specification means a sulfonated polymer having the following structure:

(wherein, —X— is a single bond or a divalent organic group; —W— is a divalent electron attracting group; -T- is a divalent organic group; $R^1$ to $R^8$ are a hydrogen atom or fluorine atom, an alkyl group, aryl group, allyl group or cyano group, and may be the same or different; "p" is 0.5 to 100; "q" is 99.5 to 0; "r" is an integer of 0 to 10; and "s" s an integer of 1 to 100).

the other hand, the average particle diameter exceeding 100 nm also may make the electrode structure insufficient in power production capacity, because of an excessive activation overvoltage possibly occurring.

More specifically, the sulfonated polyarylenes for the polymer electrolyte membrane include the polymer represented by the general formula (3):

(3)

The divalent organic group and divalent electron attracting group are the same as those for the general formula (1) or (2).

According to the electrode structure for polymer electrolyte fuel cells of the present invention, an excellent power production capacity can be achieved because the sulfonated polyarylene is used for the polymer electrolyte membrane while the electrode catalyst layer contains a noble metal catalyst at 0.1 to 1.0 mg/cm², and the carbon particles supporting the catalyst have an average size of 10 to 100 nm. Examples of the noble metal catalyst are those of platinum, rhodium and platinum-rhodium.

The electrode structure for polymer electrolyte fuel cell of the present invention may not exhibit a sufficient power production capacity, when the amount of the noble metal catalyst contained in the polymer electrolyte membrane as a catalyst is below 0.1mg/cm². At above 1. mg/cm², on the other hand, it may not only exhibit an insufficient power production capacity conversely but also is economically disadvantageous because of increased cost.

Moreover, it may not exhibit a sufficient power production capacity, when the carbon particles supporting the noble metal catalyst particles have an average size of below 10 nm, because of lowered dispersibility of the catalyst particles. On The electrode structure for polymer electrolyte fuel cell of the present invention comprises an electrode diffusion layer on the electrode catalyst layers, whereby the fuel gas supplied being guided to the electrode catalyst layers via the electrode diffusion layer on one side, and the oxidizing gas supplied being guided to the electrode catalyst layer also via the electrode diffusion layer on the other side.

The electrode structure for polymer electrolyte fuel cell of the present invention can work as a polymer electrolyte fuel cell by supplying the fuel gas to one of the electrode catalyst layers and the oxidizing gas to the other electrode catalyst layer.

The polymer electrolyte fuel cell which includes the electrode structure for polymer electrolyte fuel cell of the present invention can be employed as a power source, back-up power source or the like for electric/electronic devices, e.g., personal computers and cellular phones. It is also serviceable as a power source for transportation devices, e.g., automobiles and ships (e.g., submarines).

DETAILED DESCRIPTION OF THE PREFERRED EMBODIMENTS

One of the preferred embodiments of the present invention is described in more detail by referring to the attached drawings.

Figure 1:
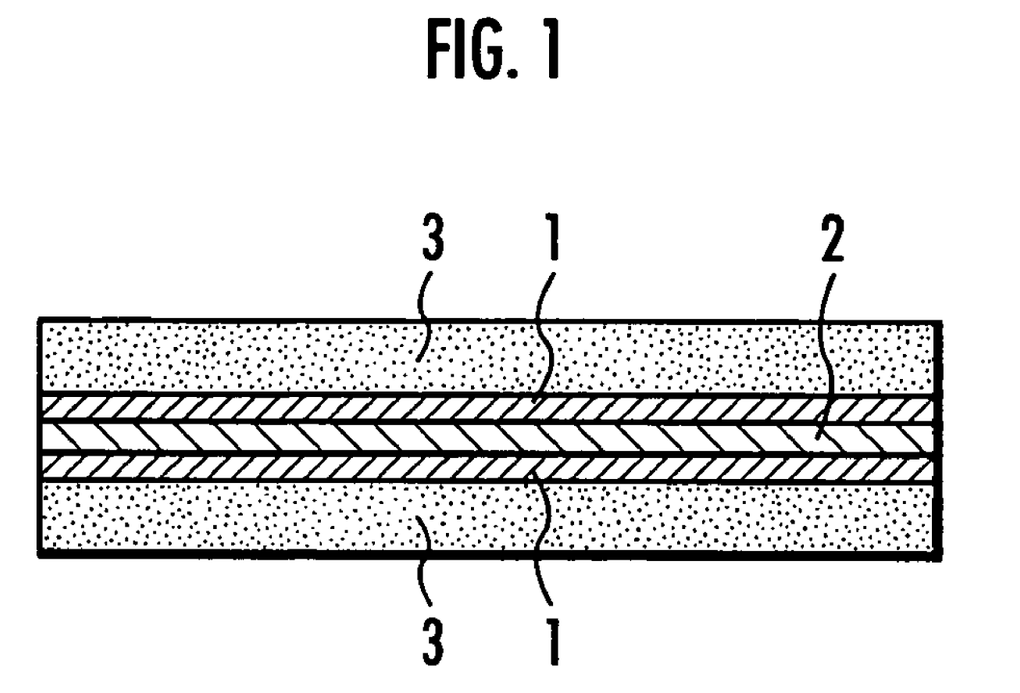
FIG. 1 is an illustrative cross-section of one embodiment of the electrode structure, prepared in Example 1.

Referring to FIG. 1, the preferred embodiment of the electrode structure is comprising a pair of the electrode catalyst layers 1,1, polymer electrolyte membrane 2 sandwiched between these electrode catalyst layers 1,1, and diffusion layers 3,3, each laminated on each electrode catalyst layer.

The electrode catalyst layer 1 is composed of catalyst particles and ion-conductive binder, wherein platinum particles are for example included as the catalyst at 0.1 to 1.0 mg/cm². The catalyst particles are noble metal catalyst particles such as the platinum particles supported by carbon particles, e.g., those of carbon black (furnace black), and have an average particle diameter of 10 to 100 nm. The platinum particle/carbon particle weigh ratio is set at, e.g., platinum particle: carbon particle=1:1. A polymer electrolyte, e.g., perfluoroalkylenesulfonic acid compound (e.g., Du Pont's Nafion (trade name)) or sulfonated polyarylene-based polymer, is used for the ion-conductive binder.

The polymer electrolyte membrane 2 is formed by the sulfonated polyarylene consisting of the first repeating unit represented by the general formula (1) and second repeating unit represented by the general formula (2):

(1)

(wherein, A is a divalent organic group; and a benzene ring includes its derivative), (2)

(wherein, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different).

Examples of the divalent organic group include electron attracting groups, e.g., —CO—, —CONH—, —$(CF_2)_p$— ("p" is an integer of 1 to 10), —$C(CF_3)_2$—, —COO—, —SO— and —$SO_2$—; electron donating groups, e.g., —O—, —S—, —CH=CH—, and —C≡C—; and groups represented by the following formula:

Examples of the divalent electron attracting group include —CO—, —CONH—, —$(CF_2)_p$— ("p" is an integer of 1 to 10), —$C(CF_3)_2$—, —COO—, —SO— and —$SO_2$—.

The electron attracting group is a divalent group having a Hammet substituent constant of 0.06 or more at the meta-site of a phenyl group and 0.01 or more at the para-site of a phenyl group.

The derivatives of benzene ring include a phenylene group having at least one substituent selected from the group consisting of a fluorine atom, and an alkyl group, fluorine-substituted alkyl group, allyl group and aryl group. When it has 2 or more substituents, they may be the same or different.

Examples of the alkyl group include a methyl group, ethyl group, propyl group, butyl group, amyl group and hexyl group, of which methyl group and ethyl group are more preferable.

Examples of the fluorine-substituted alkyl group include a trifluoromethyl group, perfluoroethyl group, perfluoropropyl group, perfluorobutyl group, perfluoropentyl group and perfluorohexyl group, of which a trifluoromethyl group and perfluoroethyl group are more preferable.

Examples of the allyl group include a propenyl group, and those of the aryl group include a phenyl group and pentafluorophenyl group.

In the general formula (2), "1" is a positive integer, upper limit of which is normally 100, preferably 80.

The sulfonated polyarylene may consist only of the first repeating unit represented by the general formula (1), but preferably has the second repeating unit represented by the general formula (2) additionally, to improve toughness of the polymer electrolyte membrane. It preferably consists of 0.5 to 99.999% by mol of the first repeating unit and 0.001 to 99.5% by mol of the second repeating unit.

The sulfonated polyarylene can be prepared by copolymerization of 0.5 to 100% by mol, preferably 0.5 to 99.999% by mol, of the first component represented by the general formula (1') with 0 to 99.5% by mol, preferably 0.001 to 99.5% by mol, of the second component represented by the general formula (2'), and then hydrolyzing the sulfonic acid ester group (—$SO_3R$)

(1')

(wherein, A is a divalent organic group; and a benzene ring includes its derivative), (2')

(wherein, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different).

The electron attracting group, electron donating group and derivative of benzene ring is the same as those in the general formula (1) or (2).

In the general formula (1'), X is a halogen atom (chlorine, bromine or iodine) except fluorine, or an atom or a group selected from the group consisting of —$OSO_3CH_3$ and —$OSO_3CF_3$; and R is a hydrocarbon group of 4 to 20 carbon atoms, more specifically, tert-butyl group, iso-butyl group, n-butyl group, sec-butyl group, neopentyl group and cyclopentyl group or the like.

In the general formula (2'), R' and R" are each a halogen atom except fluorine or a group selected from the group consisting of —$OSO_2Z$ (Z is analkyl group, fluorine-substituted alkyl group or aryl group). The alkyl group represented by Z includes methyl group and ethyl group; fluorine-substituted alkyl groups includes trifluoromethyl group; and aryl groups includes phenyl group and p-tolyl group. In the general formula (2'), "l" is a positive integer, upper limit of which is normally 100, preferably 80.

The first component may be copolymerized with the second component in the presence of a catalyst system containing a transition metal compound. The catalyst system is composed of a transition metal salt, a compound as a ligand and a reducing agent, or a transition metal complex (including copper salt) and a reducing agent, the former having a coordinated ligand. It may contain a "salt" to accelerate polymerization.

Examples of the transition metal salt include nickel chloride and nickel bromide; those of the compound serving as the ligand include triphenylphosphine and 2,2'-bipyridine; and those of the reducing agent include zinc, magnesium and manganese. Examples of the transition metal complex having a coordinated ligand, which may be used in place of the transition metal salt and the compound as the ligand, include nickel chloride bis (triphenylphosphine) and nickel chloride (2,2'-bipyridine).

The copolymer of the first and second component is hydrolyzed by one of the following procedures: stirring the copolymer for 5 minutes or more, after being thrown into an excessive quantity of water or alcohol containing a small quantity of hydrochloric acid; reaction of the copolymer in trifluoroacetic acid at around 80 to 120° C. for around 5 to 10 hours; and reaction of the copolymer in a solution, e.g., N-methylpyrrolidone solution, which contains 1 to 3 times mols of lithium bromide per mol of the sulfonic acid ester group (—$SO_3R$) present in the copolymer at around 80 to 150° C. for around 3 to 10 hours, and then adding hydrochloric acid to the effluent.

Examples of the sulfonated polyarylene include a polymer represented by the general formula (3):

(3)

(wherein, "m:n"=0.5 to 100:95.5 to 0, preferably 0.5 to 99.999:95.5 to 0.001; and "l" is a positive integer.

The polymer electrolyte membrane 2 maybe formed by casting, in which the sulfonated polyarylene represented by the general formula (3), dissolved in a solvent, is extended into a film on a base. Thickness of the dried film is normally 10 to 100 µm, preferably 20 to 80 µm. The solvent may be of N-methyl-2-pyrrolidone, and base may be of a polyethylene terephthalate film.

For production of the polymer electrolyte membrane 2, polyarylene ester of sulfonic acid is made into a film following the above procedure before it is hydrolyzed, and then hydrolyzed.

The diffusion layer 3 is composed of a carbon paper coated with an under layer (not shown). The under layer may be of a mixture of carbon black and polytetrafluoroethylene particles in a ratio of 4:6 by weight.

The electrode structure as one embodiment of the present invention, shown in FIG. 1, can work as a fuel cell by inducing a reducing gas, e.g., hydrogen or methanol, into the electrode catalyst layer 1 via the diffusion layer 3 on the fuel electrode (anode) side, and an oxidizing gas, e.g., air or oxygen, into the electrode catalyst layer 1 via the diffusion layer 3 on the oxygen electrode (cathode) side. When the reducing gas such as hydrogen or methanol is introduced to the electrode catalyst layer 1 on the fuel electrode side, this structure produces proton and electron from the reducing gas on the fuel electrode by the actions of the catalyst in the electrode catalyst layer 1, the proton moving towards the electrode catalyst layer 1 on the oxygen electrode side via the polymer electrolyte membrane 2, to react with the oxidizing gas and electron induced in the electrode catalyst layer 1 on the oxygen electrode side and produce water by the actions of the catalyst contained in the catalyst layer 1. Therefore, a current can be produced by connecting the fuel electrode and oxygen electrode to each other by a cable, to produce a circuit which sends the electron formed on the fuel electrode towards the oxygen electrode.

The sulfonated polyarylene for the present embodiment may be replaced by a sulfonated polyetheretherketone (PEEK) as a less expensive hydrocarbon-based polymer than a perfluoroalkylenesulfonic acid compound, for the polymer electrolyte membrane 2.

However, the polymer electrolyte membrane of sulfonated polyetheretherketone involves problems resulting from low durability under hydrothermal conditions, although good in gas barrier property. Decreasing its sulfonating equivalents to decrease its ion-exchanging capacity does improve its durability under hydrothermal conditions. However, a polymer electrolyte membrane of low ion-exchanging capacity naturally cannot secure a sufficient power production capacity.

Sulfonated polyarylenes include the polymer represented by the general formula (4), in addition to the one for the present embodiment:

(4)

However, the polymer represented by the general formula (4) involves problems resulting from very low toughness, and low durability and handleability.

The polymer represented by the general formula (5) is still another sulfonated polyarylene.

(5)

The polymer represented by the general formula (5) is tougher than the one represented by the general formula (4), and hence realizes a higher power production capacity. Moreover, it is serviceable for a much longer time.

However, the polymer represented by the general formula (5) is prepared by copolymerizing the repeating unit represented by the general formula (6) with the repeating unit represented by the general formula (7), and sulfonating the resulting copolymer, to introduce the sulfonic group in a benzene ring which is not adjacent to the electron attracting group:

(6)

(7)

As a result, the polymer represented by the general formula (5) has the sulfonic group tending to leave the benzene ring. Therefore, such a sulfonated polyarylene needs to have higher sulfonating equivalents to secure a required ion-exchanging capacity. However, it tends to have the sulfonic group working as the crosslinking points under high temperature/low humidity conditions to produce insoluble components by the inter-molecular crosslinking reactions, increasingly as its sulfonating equivalent level increases. As a result, it loses toughness and cannot exhibit sufficient durability.

Next, examples of the present invention and comparative examples are described.

EXAMPLE 1

In this example, first prepared was the sodium salt of 4-[4-(2,5-dichlorobenzoyl)phenoxy]benzenesulfonic acid, represented by the general formula (8):

(8)

It was prepared by the following procedure. First, a 3 L-three-necked flask equipped with a stirrer and cooling tube was charged with 137.3 g (400 mmols) of 2,5-dichloro-4'-phenoxybenzophenone, and then with 500 mL of 1,2-dichloroethane to dissolve the former, to which 56 mL of concentrated sulfuric acid, 152 mL of acetic anhydride and a 2 mol/L acetyl sulfate solution freshly prepared from 400 mL of 1,2-dichloroethane were added with stirring. The reaction was allowed to proceed for 3 hours in an oil bath kept at 60° C. Then, 30 mL of 1-propanol was added to terminate the reaction. Then, the reaction system was concentrated to a volume of 400 mL, to which an aqueous NaOH solution (120 g (3 mols) of NaOH/400 mL of water) was added. The 1,2-dichloroethane remaining in the reaction system was removed by azeotropic distillation, the resulting transparent light-yellowish solution was cooled, and the separated precipitate was recovered by filtration. It was dried under a vacuum at 70° C. to prepare the fine white powder of sodium salt of 4-[4-(2,5-dichlorobenzoyl)phenoxy]benzenesulfonic acid (crude crystal) as the target.

Next, the as-received crude crystal was used without further purification to prepare 4-[4-(2,5-dichlorobenzoyl)phenoxy]benzenesulfonyl chloride, represented by the general formula (9).

(9)

The compound represented by the general formula (9) was prepared by the following procedure. First, 300 mL of acetonitrile as a solvent, 200 mL of sulfolane and then 245.3 g (1.6 mols) of phosphoryl trichloride were added to 215 g (around 400 mmols) of the crude crystal of sodium salt of 4-[4-(2,5-dichlorobenzoyl)phenoxy]benzenesulfonic acid, and the reactions were allowed to proceed at 70° C. Then, 5 mL of N,N-dimethylacetoamide was added to the reaction system, and the resultant yellow suspension was stirred at 71 to 73° C. for 40 minutes, and cooled to 3° C. Next, 1 L of cool water was added to the reaction system at a rate to keep the reaction system at 10° C. or lower. The precipitate was collected, washed with cool water and recrystallized with 350 mL of toluene, to prepare 135 g of the white crystal of 4-[4-(2,5-dichlorobenzoyl)phenoxy]benzenesulfonyl chloride as the target product (melting point: 130.5 to 131.5° C. in a yield of 87% based on the sodium salt of 4-[4-(2,5-dichlorobenzoyl)phenoxy]benzenesulfonic acid.

Next, 4-[4-(2,5-dichlorobenzoyl)phenoxy]benzenesulfonyl chloride was used to prepare 4-[4-(2,5-dichlorobenzoyl)phenoxy]benzenesulfonic acid iso-butyl represented by the general formula (10):

(10)

The compound represented by the general formula (10) was prepared by the following procedure. First, 22.09 g (5 mmols) of 4-[4-(2,5-dichlorobenzoyl)phenoxy]benzenesulfonyl chloride and 4.0 g (55 mmols) of 2-methyl-1-propanol were added to 30 mL of a pyridine solvent dropwise in 40 minutes with mechanical stirring and cooling. The resulting thick suspension was further stirred at 12 to 15° C. for 1 hour. Next, the reaction system was incorporated with 30 mL of concentrated hydrochloric acid and 100 g of ice at a stroke, and stirred until the suspension became uniform gradually. It was then filtered quickly by a Buchner funnel, and the resulting white, viscous precipitate was recovered. The resulting precipitate was redissolved in 300 mL of ethyl acetate. The solution was washed with water by a separatory funnel, and concentrated by distillation under a vacuum to remove the solvent, after the organic layer was dried with magnesium sulfate. The lightly yellowish, oily liquid, obtained by the concentration procedure, was dissolved in 30 mL of hot hexane, and allowed to stand in a freezer for a couple of days, to prepare the white crystal of 4-[4-(2,5-dichlorobenzoyl)phenoxy]benzenesulfonic acid iso-butyl (melting point: 73 to 74° C.) as the target product in a yield of 70%.

Next, the oligomer represented by the general formula (11) was prepared.

(11)

The oligomer represented by the general formula (11) was prepared by the following procedure. First, a 1 L-three-necked flask equipped with a stirrer, thermometer, cooling tube, Dean-Stark tube and three-way cock for introducing nitrogen was charged with 67.3 g (0.20 mols) of 2,2-bis(4-hydroxyphenyl)-1,1,1,3,3,3-hexafluoropropane (bisphenol AF), 60.3 g (0.24 mols) 4,4'-dichlorobenzophenone, 71.9 g (0.52 mols) of potassium carbonate, 300 mL of N,N-dimethylacetamide and 150 mL of toluene, which were heated in an oil bath at 130° C. with stirring in a nitrogen atmosphere for the reactions. The reaction process was continued while water produced and toluene were removed via the Dean-Stark tube by azeotropic distillation. Essentially no production of water was observed in around 3 hours. Then, reaction temperature was gradually increased from 130 to 150° C., to remove most of toluene. After the reaction process was continued at 150° C. for 10 hours, 10.0 g of 4,4'-dichlorobenzophenone was added to the reaction system, and the process was further continued for 5 hours.

The effluent solution was left to cool, and filtered to remove inorganic precipitates as by-product. The filtrate was thrown into 4 L of methanol. The precipitated product was separated and recovered by filtration, dried and then dissolved in 30 mL of tetrahydrofuran. It was reprecipitated in 4 L of methanol to prepare 95 g of the oligomer represented by the general formula (11) in a yield of 85%.

Next, the sulfonate-esterified polyarylene represented by the general formula (12) was prepared.

The sulfonate-esterified polyarylene represented by the general formula (12) was prepared by the following procedure. First, a mixture of 15.34 g (32 mmols) of the 4-[4-(2,5-dichlorobenzoyl)phenoxy]benzenesulfonic acid iso-butyl represented by the general formula (10), 10.52 g (1.33 mmols) of the oligomer represented by the general formula (11) (number-average molecular weight: 7940), 0.65 g (1 mmol) of bis(triphenylphosphine) nickel dichloride, 33.50 g (13.33 mmols) of triphenylphosphine, 0.65 g (4.83 mmols) of sodium iodide and 5.45 g (83.33 mmols) of powdered zinc was incorporated with 60 mL of dried N-methylpyrrolidone in a nitrogen atmosphere.

The reaction system was heated with stirring to 74° C., at which the reaction process was allowed to proceed for 3 hours. It showed increased viscosity during the reaction process. The resulting polymerized solution was diluted with 250 mL of tetrahydrofuran, stirred for 30 minutes, and filtered in the presence of celite as a filtration aid. The filtrate was poured in a largely excessive quantity of methanol (1500 mL) for solidification. The solidified product was separated by filtration, dried in wind, and redissolved in a mixed solvent of tetrahydrofuran (200 mL) and N-methylpyrrolidone (30 mL), and solidified/separated in a largely excessive quantity of methanol (1500 mL). It was dried in wind and then under heating, to prepare 20.54 g of the polyarylene ester of sulfonic acid represented by the general formula (12) as the target product (yellowish, flaky form) in a yield of 78%.

Next, 5.08 g of the polyarylene ester of sulfonic acid represented by the general formula (12) was dissolved in 60 mL of N-methylpyrrolidone, and heated to 90° C. Then, the reaction system was incorporated with a mixture of methanol (50 mL) and concentrated hydrochloric acid (8 mL) at a stroke. The resulting suspension of the reaction solution was treated under mild reflux conditions for reaction for 10 hours, and then distilled to remove an excessive quantity of methanol, after the distillation unit was attached to the reaction system, to prepare a lightly green, transparent solution of the sulfonated polyarylene represented by the general formula (3)

(12)

(3)

Next, the lightly green, transparent solution was made into a film on a glass plate by casting, immersed in water for 3 days, and dried in wind and then dried under vacuum, to prepare the polymer electrolyte membrane 2 with dry film thickness of 50 μm.

In Example 1, platinum particles were supported by carbon black (furnace black) having an average particle diameter of 30 nm to prepare the catalyst particles (at a weight ratio of carbon particle:platinum particle=1:1).

Next, the catalyst particles were uniformly dispersed in a perfluoroalkylenesulfonic acid compound (e.g., Du Pont's Nafion (trade name)) solution as an ion-conductive binder, to prepare the catalyst paste (at a weight ratio of catalyst particle:ion-conductive binder=5:7).

Next, a slurry prepared by uniformly dispersing a mixture of carbon black and polytetrafluoroethylene (PTFE) particles (at a weight ratio of 4:6) in ethylene glycol was spread on one side of a carbon paper, and dried to prepare an under layer. This produced the diffusion layer 3, composed of the carbon paper and the under layer.

The catalyst paste was spread on the under layer of the diffusion layer 3 so that the content of the platinum becomes 0.12 mg/cm$^2$ by screen printing, heated at 60° C. for 10 minutes and then at 120° C. under a vacuum for 60 minutes, and dried, to prepare the catalyst layer 1.

Next, the polymer electrolyte membrane 2 was placed between the catalyst layers 1,1, and hot-pressed at 150° C. and 2.5 MPa for 1 minute, to prepare the monolithic, electrode structure, illustrated in FIG. 1.

Figure 2:
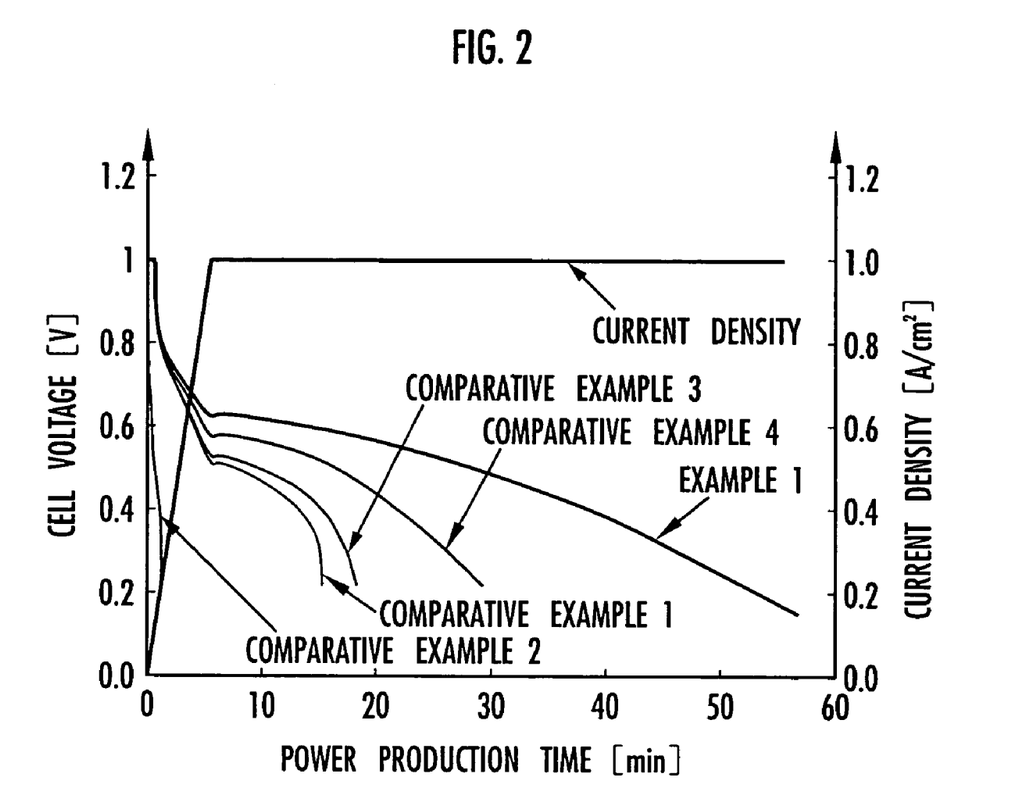
FIG. 2 shows power generation capacity of the electrode structure.

Next, the electrode structure prepared in the present example was aged at a cell temperature of 70° C. and humidity of 73% RH for both electrodes, and used for power production at a cell temperature of 90° C. and humidity of 0% RH for both electrodes, where current density was increased to 1.0 A/cm$^2$ in 5 minutes after the power production was started and then kept at this level. FIG. 2 shows temporal changes of cell potential.

Figure 3:
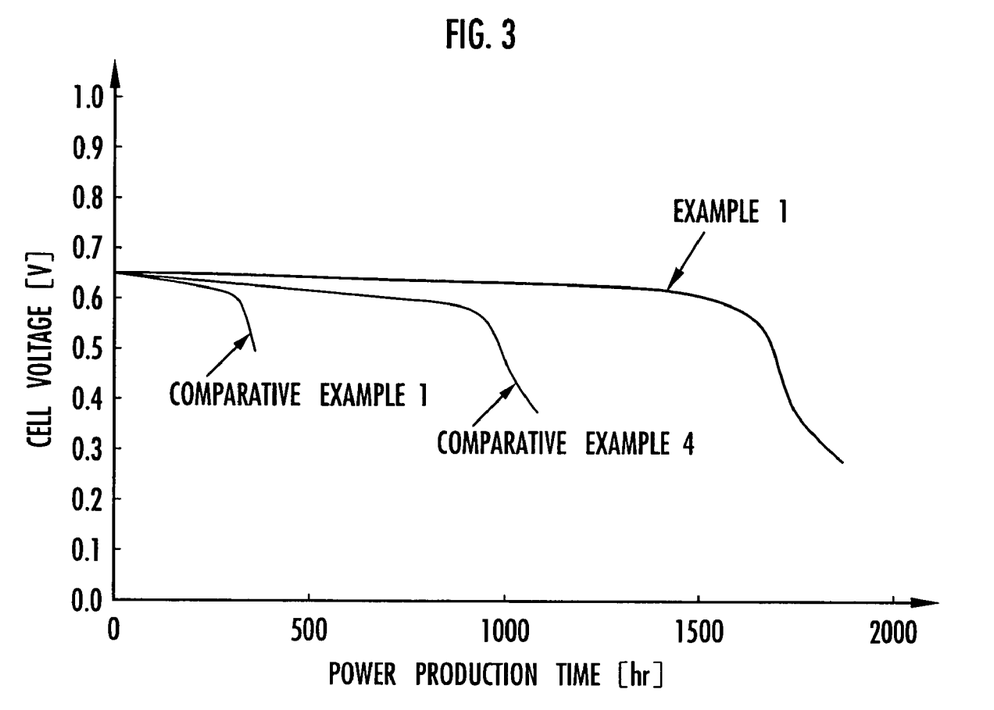
FIG. 3 also shows power generation capacity of the electrode structure.

Next, the electrode structure prepared in the present example was used for power production at a cell temperature of 85° C., current density of 1.0 A/cm$^2$, and humidity of 30% RH on the anode (fuel electrode) side and 50% on the cathode (oxygen electrode) side. FIG. 3 shows temporal changes of cell potential.

COMPARATIVE EXAMPLE 1

The electrode structure illustrated in FIG. 1 was prepared in Comparative Example 1 in the same manner as in Example 1, except that the polymer electrolyte membrane 2 of a perfluoroalkylenesulfonic acid polymer compound (e.g., Du Pont's Nafion (trade name)) was used.

Next, the electrode structure prepared in the present comparative example was used for power production at a cell temperature of 90° C. and humidity of 0% RH for both electrodes, where current density was increased to 1.0 A/cm$^2$ in 5 minutes after the power production was started and then kept at this level. FIG. 2 shows temporal changes of cell potential.

Next, the electrode structure prepared in the present comparative example was used for power production at a cell temperature of 85° C., current density of 1.0 A/cm$^2$, and humidity of 30% RH on the anode (fuel electrode) side and 50% on the cathode (oxygen electrode) side. FIG. 3 shows temporal changes of cell potential.

COMPARATIVE EXAMPLE 2

The electrode structure illustrated in FIG. 1 was prepared in Comparative Example 2 in the same manner as in Example 1, except that the polymer electrolyte membrane 2 of sulfonated polyetheretherketone (PEEK) was used.

Next, the electrode structure prepared in the present comparative example was used for power production at a cell temperature of 90° C. and humidity of 0% RH for both electrodes, where current density was increased to 1.0 A/cm$^2$ in 5 minutes after the power production was started and then kept at this level. FIG. 2 shows temporal changes of cell potential.

COMPARATIVE EXAMPLE 3

The electrode structure illustrated in FIG. 1 was prepared in Comparative Example 3 in the same manner as in Example 1, except that the polymer electrolyte membrane 2 of the sulfonated polyarylene represented by the general formula (4) was used.

(4)

Next, the electrode structure prepared in the present comparative example was used for power production at a cell temperature of 90° C. and humidity of 0% RH for both electrodes, where current density was increased to 1.0 A/cm² in 5 minutes after the power production was started and then kept at this level. FIG. 2 shows temporal changes of cell potential.

COMPARATIVE EXAMPLE 4

The electrode structure illustrated in FIG. 1 was prepared in Comparative Example 4 in the same manner as in Example 1, except that the polymer electrolyte membrane 2 of the sulfonated polyarylene represented by the general formula (5) was used.

The sulfonated polyarylene represented by the general formula (5) was prepared by the following procedure.

First, the oligomer represented by the general formula (11) was prepared in the same manner as in Example 1.

Next, a flask was charged with 28.4 g (2.87 mmols) of the oligomer represented by the general formula (11), 29.2 g (67.1 mmols) of 2,5-dichloro-4'-(4-phenoxy)phenoxybenzophenone, 1.37 g (2.1 mmols) of bis(triophenylphosphine) nickel dichloride, 1.36 g (9.07 mmols) of sodium iodide, 7.34 g (28.0 mmols) of triphenylphosphine and 11.0 g (168 mmols) of powdered zinc, and then substituted with dried nitrogen. The mixture was incorporated with 130 mL of N-methyl-2-pyrrolidone, heated to 80° C., at which the polymerization was carried out for 4 hours with stirring. Then, the resulting polymerized solution was diluted with tetrahydrofuran, and solidified with hydrochloric acid/methanol and recovered. The recovered polymer was washed with methanol repeatedly, and dissolved in tetrahydrofuran. It was purified by reprecipitation in methanol, and separated by filtration. The resulting polymer was dried under a vacuum, (5)

(11)

to prepare 5.07 g of the polyarylene represented by the general formula (5') in a yield of 96%.

(5')

Next, 25 g of the polyarylene represented by the general formula (5') was put in a 500 mL separable flask, to which 250 mL of 96% sulfuric acid was added, and the mixture was stirred for 24 hours in a nitrogen atmosphere. The resulting solution was poured into a large quantity of ion-exchanged water to precipitate the polymer therein. The polymer was washed with water repeatedly until the wash water reached pH 5 and dried, to prepare 29 g of the sulfonated polyarylene represented by the general formula (5) in a yield of 96%.

Next, the sulfonated polyarylene represented by the general formula (5) was dissolved in N-methyl-2-pyrrolidone, to prepare a polymer electrolyte solution. The solution was made into a film by casting, and dried at 80° C. in an oven, to prepare the polymer electrolyte membrane 2 with a dry film thickness of 50 μm.

Next, the electrode structure prepared in the present comparative example was used for power production at a cell temperature of 90° C. and humidity of 0% RH for both electrodes, where current density was increased to 1.0 A/cm² in 5 minutes after the power production was started and then kept at this level. FIG. 2 shows temporal changes of cell potential.

Next, the electrode structure prepared in the present comparative example was used for power production at a cell temperature of 85° C., current density of 1.0 A/cm², and humidity of 30% RH on the anode (fuel electrode) side and 50% on the cathode (oxygen electrode) side. FIG. 3 shows temporal changes of cell potential.

It is apparent, as shown in FIG. 2, that the polymer electrolyte membrane 2 of the sulfonated polyarylene represented by the general formula 3 (prepared in Example 1) can be serviceable for power production for a longer time even under high temperature/low humidity conditions than any of the polymer electrolyte membranes 2 prepared in Comparative Examples 1 to4, of a perfluoroalkylenesulfonic acid compound, sulfonated polyetheretherketone, or another sulfonated polyarylene represented by the general formula (4) or (5), indicating that it has excellent durability.

It is also apparent, as shown in FIG. 3, that the polymer electrolyte membrane 2 of the sulfonated polyarylene represented by the general formula 3 (prepared in Example 1) can be serviceable for power production for a longer time also at higher temperature than any of the polymer electrolyte membranes 2 prepared in Comparative Examples 1 and 4, of a perfluoroalkylenesulfonic acid compound, or another sulfonated polyarylene represented by the general formula (5), indicating that it has excellent durability at a higher temperature.

EXAMPLE 2

The polymer electrolyte membrane 2 (dry film thickness: 40 μm, ion-exchanging capacity: 2.0 meq/g) of the sulfonated polyarylene represented by the general formula (3) was prepared in Example 2 in the same manner as in Example 1. Next, the electrode structure illustrated in FIG. 1 was prepared in the same manner as in Example 1, except that the polymer electrolyte membrane 2 prepared in Example 2 was used.

Next, the electrode structure prepared in the present example was used for power production for 200 hours under the conditions of temperature: 85° C., service factor on the fuel electrode side: 50%, service factor on the oxygen electrode side: 50% and current density: 1 A/cm². Its cell potential was measured at the same current density. The results are given in Table 1.

EXAMPLE 3

The electrode structure was prepared in Example 3 in the same manner as in Example 2, except that platinum was contained at 0.3 mg/cm².

It was measured for its cell potential in the same manner as in Example 2. The results are given in Table 1.

EXAMPLE 4

The electrode structure was prepared in Example 4 in the same manner as in Example 2, except that platinum was contained at 0.5 mg/cm².

It was measured for its cell potential in the same manner as in Example 2. The results are given in Table 1.

EXAMPLE 5

The electrode structure was prepared in Example 5 in the same manner as in Example 2, except that platinum was contained at 0.9 mg/cm².

It was measured for its cell potential in the same manner as in Example 2. The results are given in Table 1.

REFERENCE EXAMPLE 1

The electrode structure was prepared in Reference Example 1 in the same manner as in Example 2, except that platinum was contained at 0.05 mg/cm².

It was measured for its cell potential in the same manner as in Example 2. The results are given in Table 1.

REFERENCE EXAMPLE 2

The electrode structure was prepared in Reference Example 2 in the same manner as in Example 2, except that platinum was contained at 1.1 mg/cm².

It was measured for its cell potential in the same manner as in Example 2. The results are given in Table 1.

TABLE 1

|  | Platinum content (mg/cm²) | Average particle diameter (nm) | Cell potential (V) |
| --- | --- | --- | --- |
| Reference Example 1 | 0.05 | 30 | 0.30 |
| Example 2 | 0.12 | 30 | 0.54 |
| Example 3 | 0.3 | 30 | 0.62 |
| Example 4 | 0.5 | 30 | 0.63 |
| Example 5 | 0.9 | 30 | 0.56 |
| Reference Example 2 | 1.1 | 30 | 0.41 |

It is apparent, as shown in Table 1, that each of the electrode structures prepared in Examples 2 to 5, containing platinum at 0.12 to 0.9 mg/cm², exhibits a higher cell potential and hence higher power production capacity than the one prepared in Reference Example 1 containing platinum at 0.05 mg/cm², i.e., below 0.1 mg/cm², or the one prepared in Reference Example 2 containing platinum at 1.1 mg/cm², i.e., above 1.0 mg/cm².

EXAMPLE 6

The electrode structure was prepared in Example 6 in the same manner as in Example 4, except that it included the catalyst particles with platinum particles supported by carbon black (furnace black) having an average particle diameter of 12 nm.

Next, it was measured for its cell potential in the same manner as in Example 2. The results are given in Table 2, which also shows the results of the electrode structure prepared in Example 4 again.

EXAMPLE 7

The electrode structure was prepared in Example 7 in the same manner as in Example 4, except that it included the catalyst particles with platinum particles supported by carbon black (furnace black) having an average particle diameter of 95 nm.

Next, it was measured for its cell potential in the same manner as in Example 2. The results are given in Table 2.

REFERENCE EXAMPLE 3

The electrode structure was prepared in Reference Example 3 in the same manner as in Example 4, except that it included the catalyst particles with platinum particles supported by carbon black (furnace black) having an average particle diameter of 5 nm.

Next, it was measured for its cell potential in the same manner as in Example 2. The results are given in Table 2.

REFERENCE EXAMPLE 4

The electrode structure was prepared in Reference Example 4 in the same manner as in Example 4, except that it included the catalyst particles with platinum particles supported by carbon black (furnace black) having an average particle diameter of 120 nm.

Next, it was measured for its cell potential in the same manner as in Example 2. The results are given in Table 2.

TABLE 2

|  | Platinum content (mg/cm²) | Average particle diameter (nm) | Cell potential (V) |
| --- | --- | --- | --- |
| Reference Example 3 | 0.3 | 5 | 0.36 |
| Example 6 | 0.3 | 12 | 0.54 |
| Example 4 | 0.3 | 30 | 0.62 |
| Example 7 | 0.3 | 95 | 0.56 |
| Reference Example 4 | 0.3 | 120 | 0.29 |

It is apparent, as shown in Table 2, that each of the electrode structures prepared in Examples 6, 4 and 7 with the platinum particles supported by carbon black having an average particle diameter of 12 to 95 nm exhibits a higher cell potential and hence higher power production capacity than the one prepared in Reference Example 3 with the platinum particles supported by carbon black having an average particle diameter of below 10 nm, or the one prepared in Reference Example 4 with the platinum particles supported by carbon black having an average particle diameter of above 100 nm.

What is claimed is:

1. A fuel cell comprising a pair of electrode catalyst layers, each containing a catalyst supported by carbon particles and ion-conductive binder, and a polymer electrolyte membrane placed between the electrode catalyst layers, wherein the polymer electrolyte membrane is formed from a sulfonated polyarylene consisting of 0.5 to 99.999% by mol of a first repeating unit represented by the general formula (1) and 0.001 to 99.5% by mol of a second repeating unit represented by the general formula (2):

(1)

(wherein, a benzene ring in general formula (1) includes its derivative, and A is a divalent organic group selected from the group consisting of —O—, —S—, —CH=CH—, —C≡C—, —CO—,

(wherein, I is an integer of from 1 to 100, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different).

2. A fuel cell according to claim 1, wherein said electrode catalyst layer contains a noble metal catalyst at 0.1 to 1.0 mg/cm², and said carbon particles have an average diameter of 10 to 100 nm.

3. A fuel cell according to claim 1, wherein said electrode catalyst layers comprise an electrode diffusion layer.

4. The fuel cell of claim 1, wherein $R^1$ to $R^8$ are an aryl group or a cyano group, and may be the same or different.

5. A polymer electrolyte fuel cell comprising an electrode structure for polymer electrolyte fuel cells, which comprises a pair of electrode catalyst layers, each containing a catalyst supported by carbon particles, and a polymer electrolyte membrane placed between these electrode catalyst layers, the polymer electrolyte membrane being formed by a sulfonated polyarylene as a copolymer consisting of 0.5 to 99.999% by mol of a first repeating unit represented by the general formula (1) and 0.001 to 99.5% by mol of a second repeating unit represented by the general formula (2):

(wherein, a benzene ring in general formula (1) includes its derivative, and A is a divalent organic group selected from the group consisting of —O—, —S—, —CH=CH—, —C≡C—, —CO—, (wherein, I is an integer of from 1 to 100, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different), wherein a fuel gas is supplied to one of the electrode catalyst layers and an oxidizing gas is supplied to the other electrode catalyst layer.

6. The polymer electrolyte fuel cell of claim 5, wherein $R^1$ to $R^8$ are an aryl group or a cyano group, and may be the same or different.

7. An electrical device which comprises a polymer electrolyte fuel cell comprising an electrode structure for polymer electrolyte fuel cells, which comprises a pair of electrode catalyst layers, each containing a catalyst supported by carbon particles, and a polymer electrolyte membrane placed between these electrode catalyst layers, the polymer electrolyte membrane being formed by of a sulfonated polyarylene as a copolymer consisting of 0.5 to 99.999% by mol of a first repeating unit represented by the general formula (1) and 0.001 to 99.5% by mol of a second repeating unit represented by the general formula (2):

(wherein, a benzene ring in general formula (1) includes its derivative, and A is a divalent organic group selected from the group consisting of —O—, —S—, —CH=CH—, —C≡C—, —CO—, (wherein, I is an integar of from 1 to 100, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different), and a fuel gas is supplied to one of the electrode catalyst layers and an oxidizing gas is supplied to the other electrode catalyst layer.

8. The electrical device of claim 7, wherein $R^1$ to $R^8$ am an aryl group or a cyano group, and my be the same or different.

9. A transportation device which comprises a polymer electrolyte fuel cell comprising an electrode structure for polymer electrolyte fuel cells, which comprises a pair of electrode catalyst layers, each containing a catalyst supported by carbon particles, and a polymer electrolyte membrane placed between these electrode catalyst layers, the polymer electrolyte membrane being formed by a sulfonated polyarylene as a copolymer composed of 0.5 to 99.999% by mol of a first repeating unit represented by the general formula (1) and 0.001 to 99.5% by mol of a second repeating unit represented by the general formula (2):

(1)

(wherein, a benzene ring in general formula (1) includes its derivative, and A is a divalent organic group selected from the group consisting of groups such as —O—, —S—, —CH=CH—, —C≡C—, —CO—, (2)

(wherein, l is an integer of from 1 to 100, —W— is a divalent electron attracting group; -T- is a divalent organic group; and $R^1$ to $R^8$ are a hydrogen atom or fluorine atom, an alkyl group, fluorine-substituted alkyl group, allyl group, aryl group or cyano group, and may be the same or different), and a fuel gas is supplied to one of the electrode catalyst layers and an oxidizing gas is supplied to the other electrode catalyst layer.

10. The transportation device of claim 9, wherein $R^1$ to $R^8$ are an ayl group or a cyano group, and my be the sam or different.

* * * * *